United States Patent [19]
Rahmoune et al.

[11] Patent Number: 5,913,683
[45] Date of Patent: Jun. 22, 1999

[54] LEARNING AID

[76] Inventors: Ruthie M. Rahmoune; Betty Z. Simpson, both of 10003 Quail Valley Blvd., Apt. A, Austin, Tex. 78758

[21] Appl. No.: 08/831,065

[22] Filed: Apr. 1, 1997

[51] Int. Cl.$^6$ ........................................................ G09B 5/00
[52] U.S. Cl. ............................................. 434/104; 434/101
[58] Field of Search ................................ 434/81, 84, 98, 434/101, 102, 104, 96, 198, 206, 207, 215, 259, 308, 309, 322, 331, 402, 404, 428, 433

[56] References Cited

U.S. PATENT DOCUMENTS

| | | |
|---|---|---|
| 2,229,025 | 1/1941 | Keyes . |
| 3,672,071 | 6/1972 | Prola ........................................ 434/335 |
| 4,083,120 | 4/1978 | Brendle ................................... 434/338 |
| 4,158,264 | 6/1979 | Orth ......................................... 434/311 |
| 4,298,868 | 11/1981 | Spurgeon . |
| 4,399,353 | 8/1983 | Adkins et al. . |
| 4,400,161 | 8/1983 | Gerlt . |

*Primary Examiner*—Glenn E. Richman
*Attorney, Agent, or Firm*—Joseph N. Breaux

[57] ABSTRACT

A learning aid for teaching colors including a base member having a first plurality of illuminatable colored indicator areas positioned on the exterior surface of the base member, a wheel cavity partially defined by a cavity bottom surface having a cavity bottom surface center, and a bearing tube formed into the base member through the cavity bottom surface center; a rotatable color wheel having a bearing shaft rotatably positionable within the bearing tube, magnets positioned on an underside surface of the rotatable wheel that are spaced in graduated lengths from the wheel center of the rotatable wheel; and a visual and auditory verification circuit including magnetically actuated reed switches, a like first plurality of light illuminating elements, voice synthesizer circuits, and an activation switch, one illumination element being positioned beneath each one of the illuminatable colored indicator areas, each of the reed switches being mounted on the cavity bottom surface of the base member and spaced in graduated lengths from the cavity bottom surface center in a manner such that each of the magnets is positionable in actuating position with respect to one and only one of the reed switches, each reed switch being in activating connection with one of the illumination elements and one of the voice synthesize circuits, each voice synthesizing circuit being in connection with a speaker.

7 Claims, 3 Drawing Sheets

LEARNING AID

TECHNICAL FIELD

The present invention relates to learning aids and more particularly to a learning aid for teaching individuals to associate colored areas with the word that corresponds to the color for the particular color contained within a colored area that includes a base member having a first plurality of illuminatable colored indicator areas positioned on the exterior surface of the base member, a wheel cavity partially defined by a cavity bottom surface having a cavity bottom surface center, and a bearing tube formed into the base member through the cavity bottom surface center; a rotatable color wheel having a bearing shaft rotatably positionable within the bearing tube, a first plurality of magnets positioned on an underside surface of the rotatable wheel that are spaced in graduated lengths from the wheel center of the rotatable wheel; and a visual and auditory verification circuit including a like first plurality of magnetically actuated reed switches, a like first plurality of light illuminating elements, a like first plurality of voice synthesizer circuits, and an activation switch, one illumination element being positioned beneath each one of the first plurality of illuminatable colored indicator areas, each of the reed switches being mounted on the cavity bottom surface of the base member and spaced in graduated lengths from the cavity bottom surface center in a manner such that each of the first plurality of magnets is positionable in actuating position with respect to one and only one of the first plurality of reed switches, each reed switch being in activating connection with one of the illumination elements and one of the voice synthesize circuits, each voice synthesizing circuit being :in connection with a speaker, the activation switch being in controlling electrical connection with each of the reed switches in a manner such that the activation switch must be closed before the visual and auditory verification circuit is operational.

BACKGROUND OF THE INVENTION

Many small children and other individuals can have difficulty correctly identifying a colored area with the word for the color contained within the area. It would be a benefit, therefore, to have an aid for assisting these individuals to correctly identify a colored area with the word corresponding to the color contained within the colored area. Because learning aids are often more effective when the learning experience is enjoyable, it would be a further benefit to have a learning aid including elements which individuals enjoy.

SUMMARY OF THE INVENTION

It is thus an object of the invention to provide a learning aid for that is used to assist individuals to correctly identify a colored area with the word corresponding to the color contained within the colored area.

It is a further object of the invention to provide a learning aid that includes elements which individuals enjoy.

It is a still further object of the invention to provide a learning aid for teaching individuals to associate colored areas with the word that corresponds to the color for the particular color within contained within a colored area that includes a base member having a first plurality of illuminatable colored indicator areas positioned on the exterior surface of the base member, a wheel cavity partially defined by a cavity bottom surface having a cavity bottom surface center, and a bearing tube formed into the base member through the cavity bottom surface center; a rotatable color wheel having a bearing shaft rotatably positionable within the bearing tube, a first plurality of magnets positioned on an underside surface of the rotatable wheel that are spaced in graduated lengths from the wheel center of the rotatable wheel; and a visual and auditory verification circuit including a like first plurality of magnetically actuated reed switches, a like first plurality of light illuminating elements, a like first plurality of voice synthesizer circuits, and an activation switch, one illumination element being positioned beneath each one of the first plurality of illuminatable colored indicator areas, each of the reed switches being mounted on the cavity bottom surface of the base member and spaced in graduated lengths from the cavity bottom surface center in a manner such that each of the first plurality of magnets is positionable in actuating position with respect to one and only one of the first plurality of reed switches, each reed switch being in activating connection with one of the illumination elements and one of the voice synthesize circuits, each voice synthesizing circuit being in connection with a speaker, the activation switch being in controlling electrical connection with each of the reed switches in a manner such that the activation switch must be closed before the visual and auditory verification circuit is operational.

It is a still further object of the invention to provide a learning aid that accomplishes some or all of the above objects in combination.

Accordingly, a learning aid for teaching colors is provided. The learning aid includes a base member having a first plurality of illuminatable colored indicator areas positioned on the exterior surface of the base member, a wheel cavity partially defined by a cavity bottom surface having a cavity bottom surface center, and a bearing tube formed into the base member through the cavity bottom surface center; a rotatable color wheel having a bearing shaft rotatably positionable within the bearing tube, a first plurality of magnets positioned on an underside surface of the rotatable wheel that are spaced in graduated lengths from the wheel center of the rotatable wheel; and a visual and auditory verification circuit including a like first plurality of magnetically actuated reed switches, a like first plurality of light illuminating elements, a like first plurality of voice synthesizer circuits, and an activation switch, one illumination element being positioned beneath each one of the first plurality of illuminatable colored indicator areas, each of the reed switches being mounted on the cavity bottom surface of the base member and spaced in graduated lengths from the cavity bottom surface center in a manner such that each of the first plurality of magnets is positionable in actuating position with respect to one and only one of the first plurality of reed switches, each reed switch being in activating connection with one of the illumination elements and one of the voice synthesize circuits, each voice synthesizing circuit being in connection with a speaker, the activation switch being in controlling electrical connection with each of the reed switches in a manner such that the activation switch must be closed before the visual and auditory verification circuit is operational.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF THE EXEMPLARY EMBODIMENT

Figure 1:
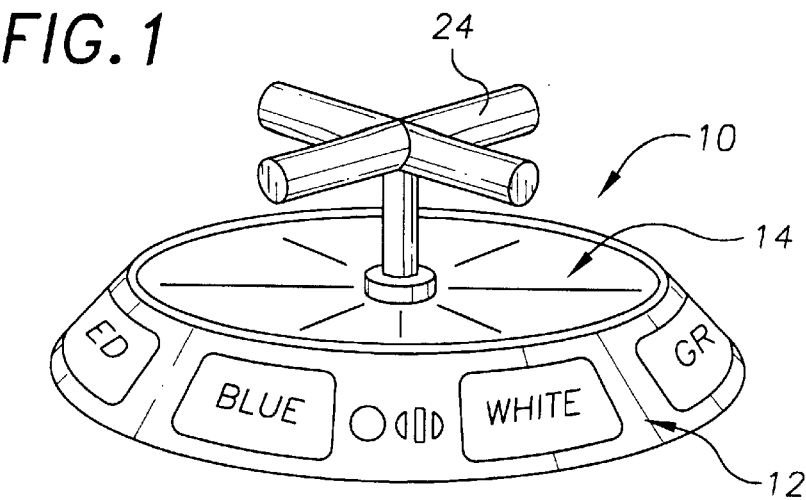
FIG. 1 is a perspective view of an exemplary embodiment of the learning aid of the present invention showing the base member, four of the eight illuminatable colored indicator areas, the activation switch, the speaker, and the rotatable color wheel with the upwardly extending spinner cross-bars.

FIG. 1 shows an exemplary embodiment of the learning aid of the present invention generally designated by the numeral 10. Learning aid 10 includes a base member, generally designated by the numeral 12; a rotatable color wheel, generally designated by the numeral 14; and a visual and auditory verification circuit 16 (shown schematically in FIG. 7).

Figure 2:
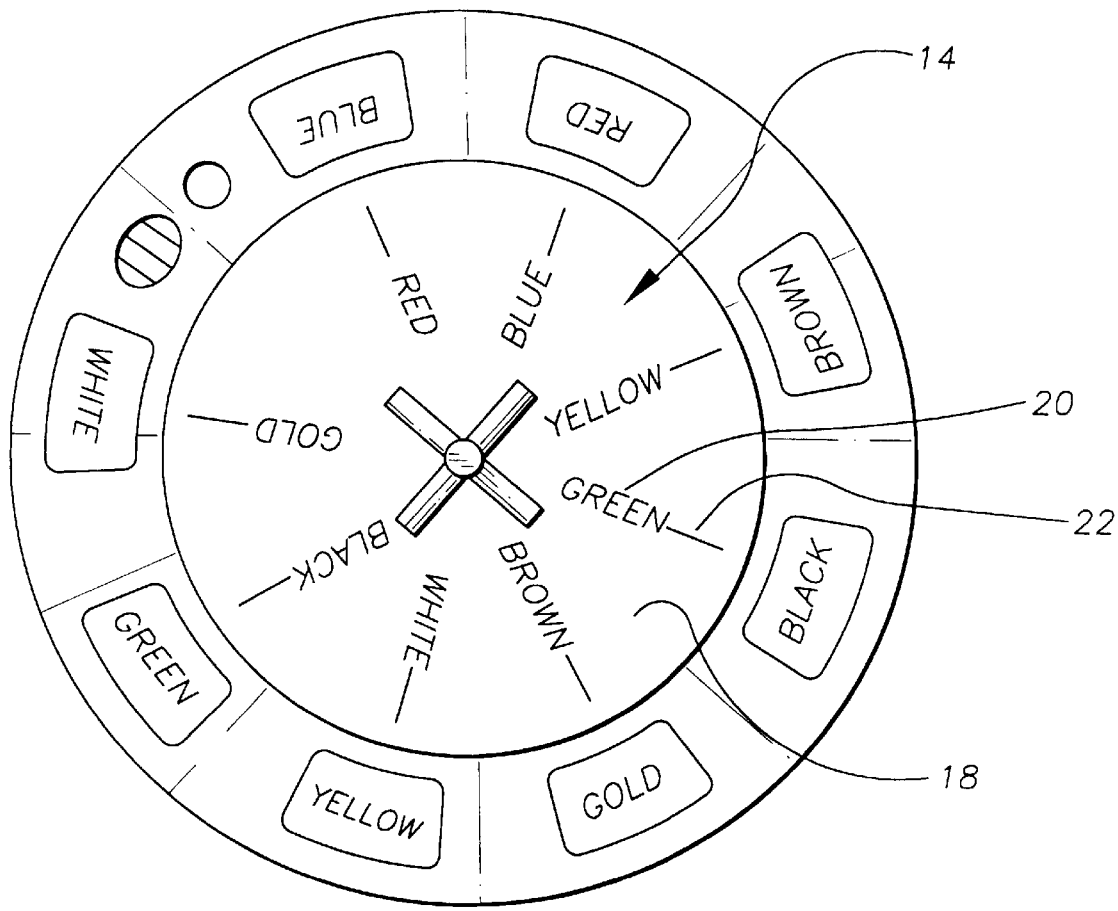
FIG. 2 is a top plan view of the exemplary learning aid of FIG. 1 showing the base member, the eight illuminatable colored indicator areas, the activation switch, the speaker, and the rotatable color wheel with the upwardly extending spinner cross-bars installed in the wheel cavity of the base member.

With reference to FIG. 2, in this embodiment rotatable color wheel 14 is molded from plastic and includes a substantially circular wheel having an upper surface 18 upon which the word 20 for eight different colors is printed or otherwise formed thereon in connection with pointer markers 22. Referring back to FIG. 1, rotatable color wheel 14 also includes upwardly standing cross-bars 24 that are used by the user to impart rotational force to rotatable wheel 14.

Figure 3:
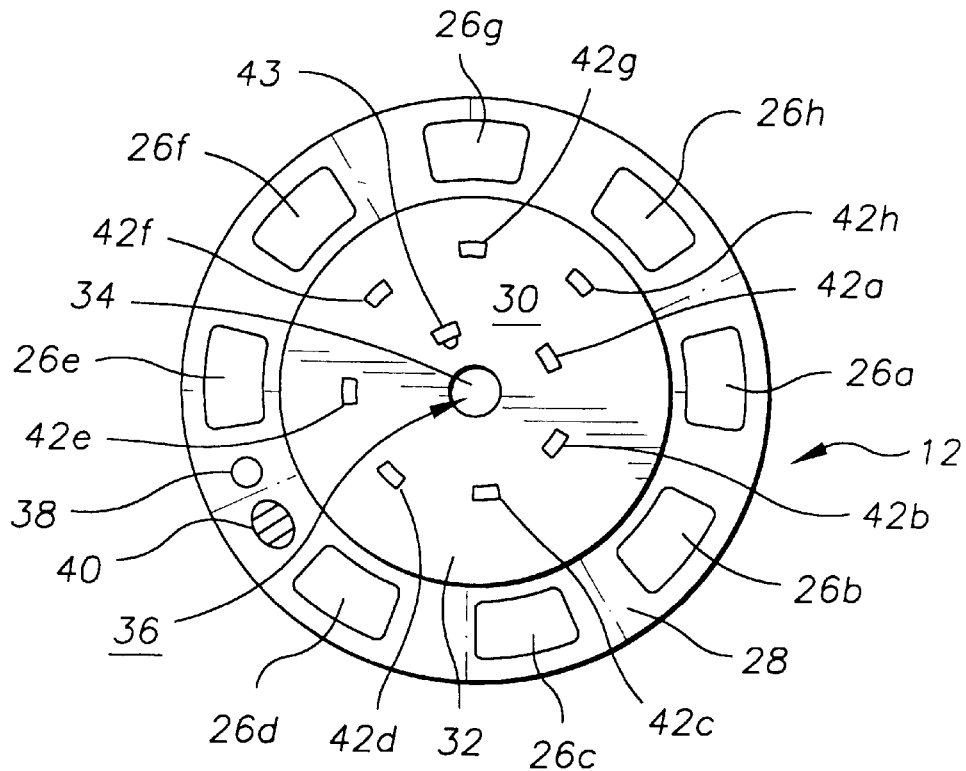
FIG. 3 is a top plan view of the base member of the learning aid of FIG. 1 with the rotatable color wheel removed showing the wheel cavity, the eight graduated radius length placement reed switches, the pivot bearing tube, and the indexing mechanism.
Figure 7:
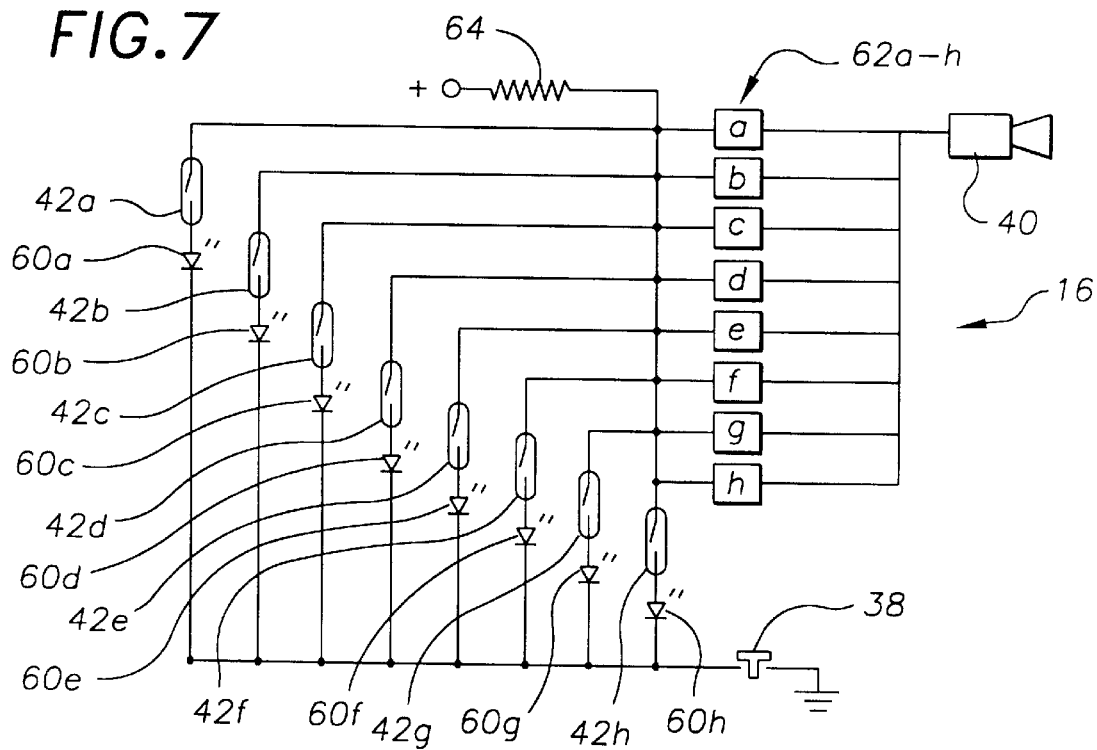
FIG. 7 is a schematic diagram of the electrical components of the visual and auditory verification circuit of the learning aid of FIG. 1 showing the speaker, the activation switch, the eight reed switches, the eight LED's, and the eight voice synthesizer chips.

Referring to FIG. 3, base member 12 is of molded plastic construction and includes eight illuminatable colored, translucent plastic, indicator areas 26a–h positioned on an exterior surface 28 of base member 12, a cylinder shaped wheel cavity 30 partially defined by a cavity bottom surface 32 having a cavity bottom surface center 34, and a bearing tube 36. Exterior surface 28 also has an opening for an activation switch 38 and a speaker 40 that form a portion of visual and auditory verification circuit 16 (FIG. 7).

Eight reed switches 42a–h are secured to cavity bottom surface 32 and are spaced radially from cavity bottom surface center 34 in increasing lengths from 42a to 42h. An indexing mechanism 43 is provided about one inch from the edge of bearing tube 36. Use of indexing mechanism 43 is discussed in further detail herein below.

Figure 4:
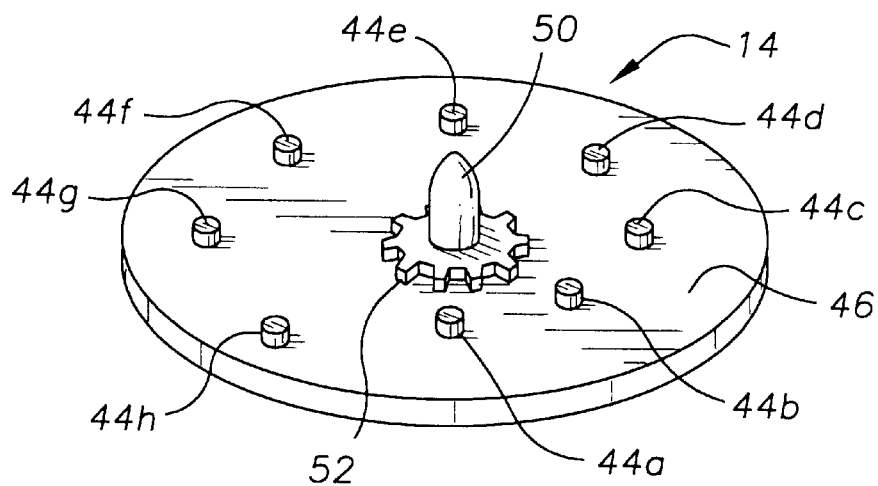
FIG. 4 is a perspective view of the underside of the rotatable wheel of the learning aid of FIG. 1 showing the graduated radius length placement magnets, the bearing shaft, and the indexing gear.

Referring now to FIG. 4, rotatable wheel 14 has a centrally positioned bearing shaft 50 extending outwardly from a bottom surface 46 thereof. An indexing gear 52 extends outwardly from bearing shaft 50 and eight permanent magnets 44a–h are secured to bottom surface 46. Each permanent magnet 44a–h is spaced radially from a center of bearing shaft 50. When bearing shaft 50 is inserted into bearing tube 36, Indexing gear 52 engages indexing mechanism 43 (FIG. 3) and each magnet 44a–h circumscribes a circle having a radius corresponding to the location of a reed switch 42a–h. Thus magnet 44a can only be positioned over and actuate reed switch 42a, and similarly with each respective pair of reed switches 42b–h and magnets 44b–h.

Figure 6:
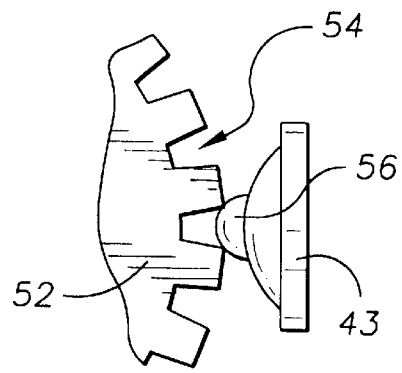
FIG. 6 is a top plan detail view showing the indexing gear engaging the spring loaded indexing button of the indexing mechanism.
Figure 5:
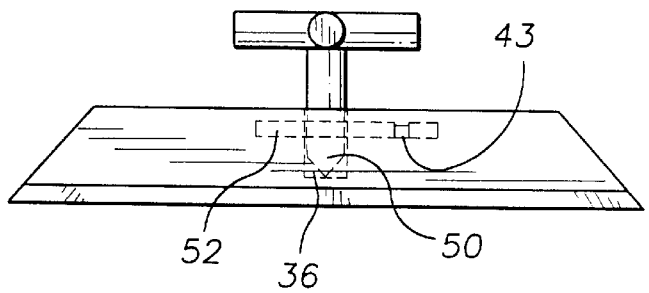
FIG. 5 is a side plan view showing the rotatable wheel rotatable installed within the wheel cavity of the base member with the bearing shaft inserted into the bearing tube and the indexing gear engaging the indexing mechanism.

Referring now to FIG. 5, during assembly bearing shaft 50 is rotatably installed within bearing tube 36 allowing rotatable wheel 14 (FIG. 2) to spin within wheel cavity 30 (FIG. 3). In order to insure that rotatable wheel 14 stops in a location wherein a magnet 44a–h is position in actuating position with respect to a reed switch 42a–h, referring now to FIG. 6, indexing gear 52 is provided with a select number of slots 54 within which a spring loaded indexing button 56 of indexing mechanism 43 is seatable. Slots 54 are sized and spaced to ensure that any time indexing button 56 is seated within a slot 54 one magnet 44a–h is actuating it corresponding reed switch 42a–h.

Referring now to FIG. 7, audio visual verification circuit 16 includes speaker 40, activation switch 38, eight reed switches 42a–h, eight LED's 60a–h, and eight voice synthesizer chips 62a–h. A pull up resister 64 is provided between the control inputs of each voice synthesizer chip 62a–h and each reed switch 42a–h. Each voice synthesizer chip is programmed with a recording of the spoken word corresponding to one of eight colors show in the illuminatable colored indicator areas 26a–h and written words 20. Each LED 60a–h is positioned beneath its corresponding illuminatable colored indicator area 26a–h. In use, when activation switch 38 is depressed, the illuminatabie colored indicator area 26a–h that corresponds to the actuated reed switch 42a–h is illuminated and the voice synthesizer chip 62a–h is activated to output the spoken version of the corresponding color "word" through speaker 40. It can be seen that children can spin rotatable wheel 14 and then each can guess what color "word" will be spoken and which illuminatable colored indicator area 26a–h will be illuminated when activation switch 38 is depressed.

It can be seen from the preceding description that a learning aid for assisting individuals to correctly identify a colored area with the word corresponding to the color contained within the colored area has been provided, wherein the learning aid includes elements which individuals enjoy; and that includes a base member having a first plurality of illuminatable colored indicator areas positioned on the exterior surface of the base member, a wheel cavity partially defined by a cavity bottom surface having a cavity bottom surface center, and a bearing tube formed into the base member through the cavity bottom surface center; a rotatable color wheel having a bearing shaft rotatably positionable within the bearing tube, a first plurality of magnets positioned on an underside surface of the rotatable wheel that are spaced in graduated lengths from the wheel center of the rotatable wheel; and a visual and auditory verification circuit including a like first plurality of magnetically actuated reed switches, a like first plurality of light illuminating elements, a like first plurality of voice synthesizer circuits, and an activation switch, one illumination element being positioned beneath each one of the first plurality of illuminatable colored indicator areas, each of the reed switches being mounted on the cavity bottom surface of the base member and spaced in graduated lengths from the cavity bottom surface center in a manner such that each of the first plurality of magnets is positionable in actuating position with respect to one and only one of the first plurality of reed switches, each reed switch being in activating connection with one of the illumination elements and one of the voice synthesize circuits, each voice synthesizing circuit being in connection with a speaker, the activation switch being in controlling electrical connection with each of the reed switches in a manner such that the activation switch must be closed before the visual and auditory verification circuit is operational.

It is noted that the embodiment of the learning aid described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A learning aid comprising:
   a base member having a first plurality of illuminatable colored indicator areas positioned on an exterior surface of said base member, a wheel cavity partially defined by a cavity bottom surface having a cavity bottom surface center, and a bearing tube formed into said base member through said cavity bottom surface center;
   a rotatable color wheel having a bearing shaft rotatably positionable within said bearing tube, a first plurality of magnets positioned on an underside surface of said rotatable wheel that are spaced in graduated lengths from the wheel center of said rotatable wheel; and
   a visual and auditory verification circuit including a first plurality of magnetically actuated reed switches, a first plurality of light illuminating elements, a first plurality of voice synthesizer circuits, and an activation switch, one illumination element being positioned beneath each one of said first plurality of illuminatable colored indicator areas, each of said reed switches being mounted on said cavity bottom surface of said base member and spaced in graduated lengths from said cavity bottom surface center in a manner such that each of said first plurality of magnets is positionable in actuating position with respect to one and only one of said first plurality of reed switches, each reed switch being in activating connection with one of said illumination elements and one of said voice synthesize circuits, each voice synthesizing circuit being in connection with a speaker, said activation switch being in controlling electrical connection with each of said reed switches in a manner such that said activation switch must be closed before said visual and auditory verification circuit is operational.

2. The learning aid of claim 1, wherein:
said illuminatabie color indicator areas are constructed from translucent plastic.

3. The learning aid of claim 1, wherein:
said rotatable color wheel is molded from plastic and includes a substantially circular wheel having an upper surface upon which the word for eight different colors is formed thereon in connection with a pointer marker.

4. The learning aid of claim 1 wherein:
said wheel cavity is cylinder shaped.

5. The learning aid of claim 2, wherein:
said rotatable color wheel is molded from plastic and includes a substantially circular wheel having an upper surface upon which the word for eight different colors is formed thereon in connection with a pointer marker.

6. The learning aid of claim 2 wherein:
said wheel cavity is cylinder shaped.

7. The learning aid of claim 5, wherein:
said wheel cavity is cylinder shaped.

\* \* \* \* \*